April 9, 1940.  C. E. KRAUS  2,196,215
MOUNTING FOR SLIDABLE MACHINE ELEMENTS
Filed Nov. 17, 1937  2 Sheets-Sheet 1
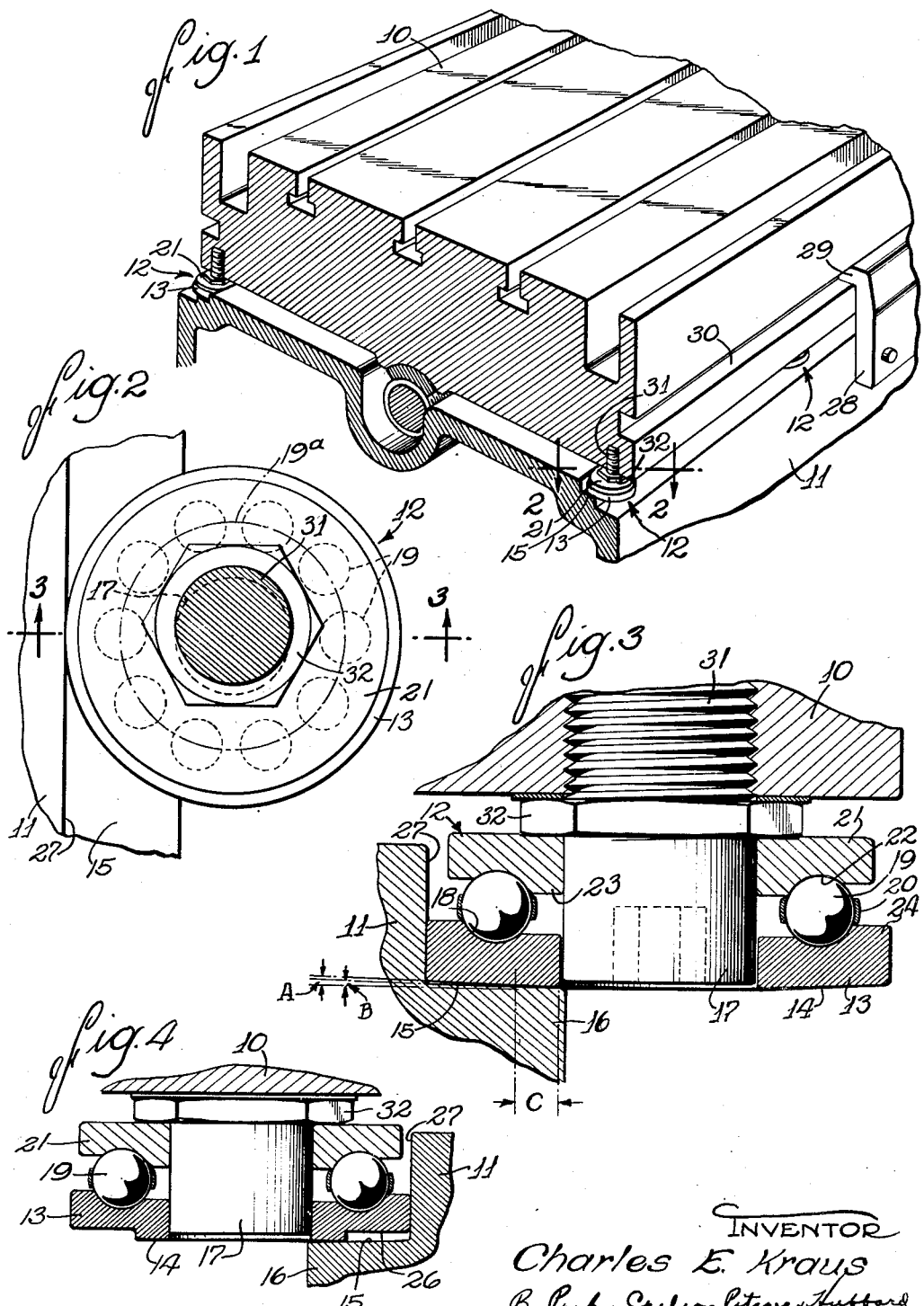
INVENTOR
Charles E. Kraus
By Parker, Carlson, Pitzner & Hubbard
ATTORNEYS April 9, 1940. C. E. KRAUS 2,196,215
MOUNTING FOR SLIDABLE MACHINE ELEMENTS
Filed Nov. 17, 1937 2 Sheets-Sheet 2
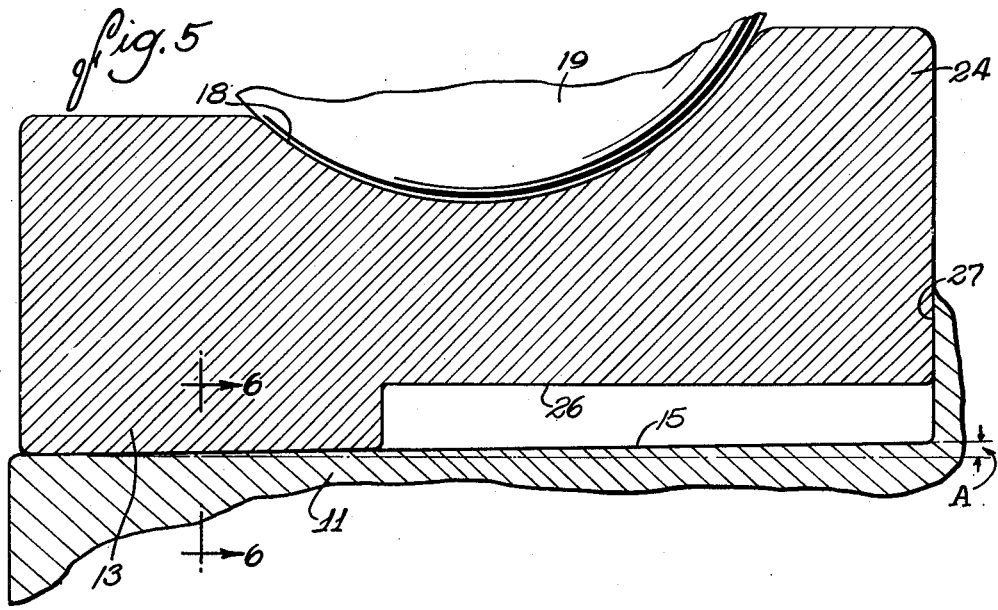
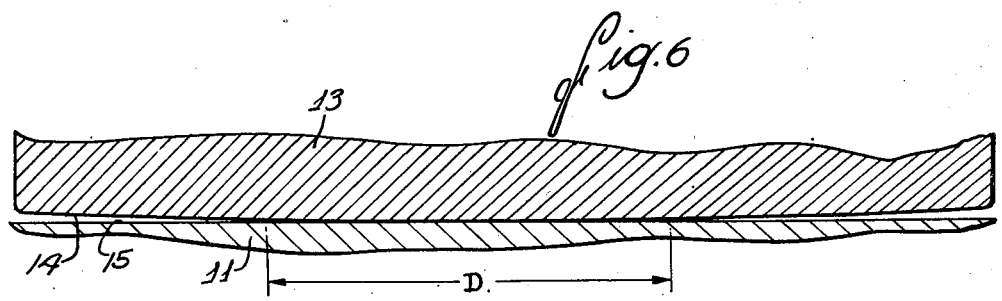
INVENTOR
Charles E. Kraus
By Parker, Carlson, Pitzner & Hubbard
ATTORNEYS Patented Apr. 9, 1940

2,196,215

UNITED STATES PATENT OFFICE 2,196,215

MOUNTING FOR SLIDABLE MACHINE ELEMENTS

Charles E. Kraus, Rockford, Ill., assignor to The Ingersoll Milling Machine Company, Rockford, Ill., a corporation of Illinois Application November 17, 1937, Serial No. 174,999

9 Claims. (Cl. 308—6)

This invention relates to the mounting of movable machine elements such as the work table or tool carriage of a machine tool.

The general object is to provide a new and improved anti-friction mounting which is inexpensive to construct and which has a high load-carrying capacity.

Other objects and advantages of the invention will become apparent from the following detailed description taken in connection with the accompanying drawings, in which Figure 1 is a fragmentary perspective view of a machine tool organization equipped with a slideway construction embodying the features of the present invention.

Fig. 2 is a fragmentary sectional view taken along the line 2—2 of Fig. 1.

Fig. 3 is an enlarged fragmentary cross-section taken along the line 3—3 of Fig. 2.

Fig. 4 is a view similar to Fig. 3 illustrating another form of the invention.

Fig. 5 is an enlarged fragmentary portion of Fig. 4.

Fig. 6 is a section taken along the line 6—6 of Fig. 5.

For convenience of illustration, the invention is shown and will be described herein as a mechanism for slidably supporting a work table or carriage 10 for reciprocation along a fixed bed 11 of a machine tool. It will be understood, however, that the invention is equally applicable to supports for tool carriages and a large variety of other slidable elements. Accordingly, there is no intention to limit the invention to the particular embodiments disclosed, the appended claims being intended to cover all modifications and alternative constructions within the spirit and scope of the invention.

In the embodiment illustrated in Fig. 1, the improved supporting mechanism includes a plurality of roller devices designated generally by the numeral 12 mounted on and located at spaced points along opposite side edges of the table. The spacing of the devices 12 is determined largely by the rigidity of the portions of the table therebetween.

Each of the roller devices includes a rotary member preferably in the form of a substantially flat roller or race ring 13 mounted to turn about an axis generally normal to the plane of movement of the machine element and arranged with one end face 14 overlying and in rolling contact with an elongated guideway 15. Herein, the guideway is disposed substantially horizontally and is formed by a ledge 16 on the machine bed, there being one such ledge on each side of the table.

Each roller 13 is loose on a vertical stud 17 threading into the underside of the table and depending therefrom so that only the outer segmental portion of the roller overlies the ledge 16. The upper end face of the roller provides an annular raceway 18 for a series of anti-friction members herein shown as balls 19 held in spaced relation by a suitable cage 20.

The roller devices 12 also include an upper ring or race 21 tight on the stud 17 and providing a downwardly facing raceway 22 in which the balls 19 run. It will be observed that the rings 13 and 21 and the balls comprise a conventional type of end and radial thrust bearing. Ledges 23 and 24 are formed on the inner and outer portions of the rings 21 and 13 respectively for adapting the bearing to sustain radial thrusts.

Friction between the ring 13 and the guideway 15 due to the weight of the table and downward forces acting thereon is reduced by shaping the opposed surfaces so as to provide for rolling contact therebetween over a substantial area the position of which with reference to balls 19 is controllable. In both illustrated forms of the invention (Figs. 3 and 4), such rolling contact is obtained by coning the lower surface of the ring 13 and inclining the guideway 15 relative to the plane of rotation of the ring. The cone angle which is indicated at A (Fig. 3) on a somewhat exaggerated scale, is preferably on the order of one and one-half degrees. B indicates the angle of inclination of the guideway 15 relative to the plane of rotation of the roller 13, this being only slightly less than the angle A. In view of this slight difference between the angles A and B and due to compression of the metal and the presence of an oil film, the conical surface of the ring 13 and the guide surface 15 engage each other through a distance C (Fig. 3). This area, it will be observed, is disposed at the inner peripheral portion of the ring surface so that the line of action of the downwardly directed forces is within the pitch circle 19ᵃ of the balls 19. Because of this, the force will be distributed to all of the balls thereby avoiding excessive pressure on a few balls or a tendency of the rings to separate.

The rolling action and distribution of the forces in the manner described above is preferably obtained by shaping the contacting surfaces in the manner shown in Figs. 4 and 5. In this instance, the ring surface 14 and the guideway 15 are inclined at the same angle A, and the area of contact is confined within the pitch circle of the balls by relieving one of the surfaces as by forming a peripheral groove as indicated at 26. With this construction, contact between the ring and the guideway occurs across the entire radial width of the ring surface 14. Moreover, the radial location of the contact area remains fixed during wear occurring in normal service use.

The effective area of contact between the ring and guide surfaces also extends longitudinally of the guide surface as indicated at D in Fig. 6. This is due to the extremely small cone angle employed, the compression of the metal and the oil film formed. In this way, unit pressure and frictional wear are further reduced.

To sustain the radial components of the forces transmitted through the bearings, the periphery of each ring 13 rolls along an upstanding wall 27 formed on the machine bed alongside the guideway 15. Preferably, each stud 17 is formed eccentrically with respect to its threaded shank 31 and has a socket at its end for receiving a wrench by which the stud may be turned to effect lateral adjustment of the roller 13. After such adjustment, a lock nut 32 is tightened to lock the parts in position.

The bearings may be lubricated in any suitable way. To keep the contacting surfaces free of chips and dirt, plates 28 may be secured to opposite sides of the machine bed with flanges 29 projecting into grooves 30 in the table. These plates also serve to clamp the table in place.

With the supporting mechanism above described, it is possible to reduce materially the power required to reciprocate a heavy machine element. In view of the advantageous manner in which the forces are distributed, the parts of the mechanism will withstand long periods of service use without objectionable wear. In addition, the construction is inexpensive in view of the fact that the parts are of simple character and generally similar in design to that used in conventional anti-friction bearing structures.

I claim as my invention:

1. In a machine tool organization, the combination with a movable machine element, and a bed having an upwardly facing guideway thereon, of a plurality of roller devices arranged at a spaced points along said machine tool element, each of said devices embodying a pair of opposed annular races carried by a vertical stud on said element, and a circular series of balls disposed between said races in rolling contact therewith, the lower one of said races being rotatable about said stud and having a generally conical end face disposed with a portion thereof in rolling contact with said guideway and with the center of load thereon disposed within the pitch circle of said balls.

2. In a machine tool organization, the combination of a bed providing spaced parallel guideways, a machine element to be reciprocated extending along said guideways, two rows of studs projecting from said element adjacent said guideways, inner and outer race rings on each of said studs, an annular series of anti-friction members between each pair of rings, a frusto-conical surface formed on the end face of each outer ring and engaging one of said guideways, said guideways being inclined relative to the plane of revolution of said outer rings, and auxiliary guideways extending along said first mentioned guideways and engaging the peripheries of said outer rings.

3. Mechanism for supporting one element for reciprocation along another element, a roller mounted on one of said elements to turn about an axis substantially perpendicular to the direction of said reciprocation, a guide surface on the other element engageable with a segmental portion of an end surface of said roller, anti-friction members arranged in an annular series around the opposite end face of said roller for sustaining the end thrust on said roller, and a second guide surface engageable with the periphery of said roller for sustaining lateral thrust on said roller.

4. Mechanism for supporting one element for reciprocation along another element, a roller mounted on one of said elements to turn about an axis substantially perpendicular to the direction of said reciprocation and having a frusto-conical end surface with a cone angle of a few degrees, a plane guide surface on the other element engageable with a segmental portion of said coned surface and inclined a few degrees relative to the plane of rotation of said roller, and anti-friction members arranged in an annular series around the opposite end face of said roller for sustaining the end thrust on said roller, the engaging portions of said roller and guide surfaces being shaped to locate the effective area of contact within the pitch circle of said anti-friction members.

5. Mechanism for supporting one element for reciprocation along another element, a roller mounted on one of said elements to turn about an axis substantially perpendicular to the direction of said reciprocation and having an end surface of shallow conical contour, a guide surface on the other element inclined relative to the plane of rotation of said roller at an angle substantially equal to the cone angle of said end surface, and a series of anti-friction members engaging the other end face of said roller, said guide surface engaging a segmental portion of said end surface over an effective area disposed within the circle of revolution of said members.

6. Mechanism for supporting one element for reciprocation along another element, a roller mounted on one of said elements to turn about an axis substantially perpendicular to the direction of said reciprocation and having a frusto-conical end surface, a plane guide surface on the other element engageable with a segmental portion of said coned surface and inclined relative to the plane of rotation of said roller, and anti-friction members arranged in an annular series around the opposite end face of said roller for sustaining the end thrust on said roller.

7. Mechanism for supporting one element for reciprocation along another element, a roller mounted on one of said elements to turn about an axis substantially perpendicular to the direction of said reciprocation, a guide surface on the other element engageable with a segmental portion of an end surface of said roller, and a series of anti-friction members engageable with the opposite side of said roller, said end and guide surfaces being shaped to provide rolling contact therebetween with the end thrust on said roller directed along a line disposed between said members and the roller axis so as to be distributed to a plurality of the members.

8. Mechanism for supporting one element for reciprocation along another element, a roller mounted on one of said elements to turn about an axis perpendicular to the plane of movement of said reciprocable element, a plane guide surface on the other element engaging a segmental portion of an end surface of said roller, said end surface being curved to provide rolling contact therebetween during movement of the reciprocable element, and a series of anti-friction members between said roller and its supporting element.

9. In a machine tool organization, the combination with a movable machine element, and a bed having an upwardly facing guideway thereon, of a plurality of roller devices arranged at spaced points along said machine tool element, each of said devices embodying a pair of opposed annular races carried by a vertical stud, a circular series of balls disposed between said races in rolling contact therewith, the lower one of said races being rotatable about said stud and having a generally conical end face disposed with a portion thereof in rolling contact with one of said guideways, auxiliary guideways extending along said first mentioned guideways and engaging the peripheries of said lower races, and means including an eccentric connection between each of said studs and said machine tool element for adjusting the positions of said lower races with respect to said auxiliary guideways.

CHARLES E. KRAUS.